United States Patent
Zhu et al.

(10) Patent No.: US 10,303,782 B1
(45) Date of Patent: May 28, 2019

(54) METHOD TO ALLOW MULTI-READ ACCESS FOR EXCLUSIVE ACCESS OF VIRTUAL DISKS BY USING A VIRTUALIZED COPY OF THE DISK

(71) Applicant: Veritas Technologies LLC, Mountain View, CA (US)

(72) Inventors: Baishen Zhu, Sanford, FL (US); Lokesha B. Krishnamurthy, Sanford, FL (US)

(73) Assignee: Veritas Technologies LLC, Santa Clara, CA (US)

( * ) Notice: Subject to any disclaimer, the term of this patent is extended or adjusted under 35 U.S.C. 154(b) by 610 days.

(21) Appl. No.: 14/584,265

(22) Filed: Dec. 29, 2014

(51) Int. Cl.
G06F 17/30 (2006.01)
G06F 11/14 (2006.01)

(52) U.S. Cl.
CPC .... G06F 17/30171 (2013.01); G06F 11/1451 (2013.01); G06F 11/1484 (2013.01); G06F 17/30238 (2013.01); *G06F 2201/80* (2013.01); *G06F 2201/815* (2013.01)

(58) Field of Classification Search
CPC ............. G06F 11/1451; G06F 11/1461; G06F 11/1466; G06F 11/1469; G06F 11/1458
See application file for complete search history.

(56) References Cited

U.S. PATENT DOCUMENTS

| | | |
|---|---|---|
| 4,912,628 A | 3/1990 | Briggs |
| 4,969,092 A | 11/1990 | Shorter |
| 5,067,072 A | 11/1991 | Talati et al. |
| 5,088,031 A | 2/1992 | Takasaki et al. |
| 5,109,510 A | 4/1992 | Baker et al. |
| 5,257,386 A | 10/1993 | Saito |
| 5,365,606 A | 11/1994 | Brooker et al. |
| 5,403,639 A | 4/1995 | Belsan et al. |
| 5,408,617 A | 4/1995 | Yoshida |
| 5,530,795 A | 6/1996 | Wan |
| 5,544,347 A | 8/1996 | Yanai et al. |
| 5,546,558 A | 8/1996 | Jacobson et al. |
| 5,608,720 A | 3/1997 | Biegel et al. |
| 5,621,912 A | 4/1997 | Borruso et al. |

(Continued)

OTHER PUBLICATIONS

"The Technology of Virtual PC", A Connectix white paper, 2001, 14 pages.

(Continued)

*Primary Examiner* — Yuk Ting Choi
(74) *Attorney, Agent, or Firm* — Meyertons Hood Kivlin Kowert and Goetzel PC; Rory D. Rankin (57) ABSTRACT

A system and method for efficient dynamic browsing of virtualized backup images. A client computer sends to a backup server a request to open a browse session for a given backup image stored on a backup medium which may be a virtual disk file. The virtual disk file is typically locked by a hypervisor for protection against consistency problems. A backup application creates a virtual copy for the given backup image if it doesn't already exist. The backup application directs each of a virtual file filter and the hypervisor to open the virtual copy in order to obtain information for later redirections and to create a lock file for the virtual copy. The backup application and the virtual file filter route access requests to the given backup image and the virtual copy based on the of access request.

20 Claims, 6 Drawing Sheets

(56) References Cited

U.S. PATENT DOCUMENTS

| | | |
|---|---|---|
| 5,649,152 A | 7/1997 | Ohran et al. |
| 5,678,042 A | 10/1997 | Pisello et al. |
| 5,734,865 A | 3/1998 | Yu |
| 5,758,355 A | 5/1998 | Buchanan |
| 5,790,114 A | 8/1998 | Geaghan et al. |
| 5,809,285 A | 9/1998 | Hilland |
| 5,822,523 A | 10/1998 | Rothschild et al. |
| 5,852,724 A | 12/1998 | Glenn, II et al. |
| 5,872,931 A | 2/1999 | Chivaluri |
| 5,889,945 A | 3/1999 | Porter et al. |
| 5,892,917 A * | 4/1999 | Myerson ............ G06F 11/3471 709/224 |
| 5,896,500 A | 4/1999 | Ludwig et al. |
| 5,909,545 A | 6/1999 | Frese et al. |
| 5,944,782 A | 8/1999 | Noble et al. |
| 5,987,565 A | 11/1999 | Gavaskar |
| 6,003,065 A | 12/1999 | Yan et al. |
| 6,029,166 A | 2/2000 | Mutalik et al. |
| 6,075,938 A | 6/2000 | Bugnion et al. |
| 6,078,990 A | 6/2000 | Frazier |
| 6,101,497 A | 8/2000 | Ofek |
| 6,131,148 A | 10/2000 | West et al. |
| 6,151,618 A | 11/2000 | Wahbe et al. |
| 6,173,332 B1 | 1/2001 | Hickman |
| 6,205,450 B1 | 3/2001 | Kanome |
| 6,209,002 B1 | 3/2001 | Gagne et al. |
| 6,212,531 B1 | 4/2001 | Blea et al. |
| 6,230,246 B1 | 5/2001 | Lee et al. |
| 6,269,431 B1 | 7/2001 | Dunham |
| 6,275,892 B1 | 8/2001 | Arnott |
| 6,298,390 B1 | 10/2001 | Matena et al. |
| 6,298,428 B1 | 10/2001 | Munroe et al. |
| 6,324,627 B1 | 11/2001 | Kricheff et al. |
| 6,324,690 B1 | 11/2001 | Luu |
| 6,341,329 B1 | 1/2002 | LeCrone et al. |
| 6,363,421 B2 | 3/2002 | Barker et al. |
| 6,363,462 B1 | 3/2002 | Bergsten |
| 6,370,614 B1 | 4/2002 | Teoman et al. |
| 6,370,646 B1 | 4/2002 | Goodman et al. |
| 6,385,613 B1 | 5/2002 | Grewell et al. |
| 6,397,242 B1 | 5/2002 | Devine et al. |
| 6,421,739 B1 | 7/2002 | Holida |
| 6,421,777 B1 | 7/2002 | Pierre-Louis et al. |
| 6,438,642 B1 | 8/2002 | Shaath |
| 6,442,663 B1 | 8/2002 | Sun et al. |
| 6,477,583 B1 | 11/2002 | Zayas et al. |
| 6,493,811 B1 | 12/2002 | Blades et al. |
| 6,496,847 B1 | 12/2002 | Bugnion et al. |
| 6,502,205 B1 | 12/2002 | Yanai et al. |
| 6,505,307 B1 | 1/2003 | Stell et al. |
| 6,529,944 B1 | 3/2003 | LeCrone |
| 6,567,849 B2 | 5/2003 | Ludovici et al. |
| 6,594,698 B1 | 7/2003 | Chow et al. |
| 6,643,671 B2 | 11/2003 | Milillo et al. |
| 6,668,264 B1 | 12/2003 | Patterson et al. |
| 6,694,346 B1 | 2/2004 | Aman et al. |
| 6,704,925 B1 | 3/2004 | Bugnion |
| 6,711,672 B1 | 3/2004 | Agesen |
| 6,715,070 B1 | 3/2004 | Peloquin et al. |
| 6,718,538 B1 | 4/2004 | Mathiske |
| 6,725,289 B1 | 4/2004 | Waldspurger et al. |
| 6,735,601 B1 | 5/2004 | Subrahmanyam |
| 6,735,603 B2 | 5/2004 | Cabrera et al. |
| 6,754,781 B2 | 6/2004 | Chauvel et al. |
| 6,754,792 B2 | 6/2004 | Nakamura et al. |
| 6,757,778 B1 | 6/2004 | van Rietschote |
| 6,763,440 B1 | 7/2004 | Traversat et al. |
| 6,763,445 B1 | 7/2004 | Klein et al. |
| 6,772,231 B2 | 8/2004 | Reuter et al. |
| 6,785,886 B1 | 8/2004 | Lim et al. |
| 6,789,103 B1 | 9/2004 | Kim et al. |
| 6,789,156 B1 | 9/2004 | Waldspurger |
| 6,795,966 B1 | 9/2004 | Lim et al. |
| 6,799,316 B1 | 9/2004 | Aguilar et al. |
| 6,854,115 B1 | 2/2005 | Traversat et al. |
| 6,917,963 B1 | 7/2005 | Hipp et al. |
| 6,961,806 B1 | 11/2005 | Agesen et al. |
| 6,961,941 B1 | 11/2005 | Nelson et al. |
| 6,981,114 B1 | 12/2005 | Wu et al. |
| 6,985,956 B2 | 1/2006 | Luke et al. |
| 6,993,635 B1 | 1/2006 | Gazit et al. |
| 7,020,760 B2 | 3/2006 | Glider |
| 7,069,413 B1 | 6/2006 | Agesen et al. |
| 7,082,598 B1 | 7/2006 | Le et al. |
| 7,089,377 B1 | 8/2006 | Chen |
| 7,111,086 B1 | 9/2006 | Ecoleston et al. |
| 7,111,145 B1 | 9/2006 | Chen et al. |
| 7,111,194 B1 | 9/2006 | Schoenthal et al. |
| 7,111,481 B2 | 9/2006 | Green et al. |
| 7,117,327 B2 | 10/2006 | Hirakawa et al. |
| 7,139,885 B2 | 11/2006 | Yamagami |
| 7,149,859 B2 | 12/2006 | Fujibayashi |
| 7,246,200 B1 | 7/2007 | van Rietschote et al. |
| 7,340,640 B1 | 3/2008 | Karr et al. |
| 7,389,394 B1 | 6/2008 | Karr et al. |
| 7,392,425 B1 | 6/2008 | Schoenthal et al. |
| 7,657,578 B1 | 2/2010 | Karr et al. |
| 7,836,267 B1 * | 11/2010 | Cross ................ G06F 11/1435 707/609 |
| 9,037,547 B1 * | 5/2015 | Shivdeo ........... G06F 17/30575 707/664 |
| 9,547,562 B1 * | 1/2017 | Feathergill ......... G06F 11/1458 707/999.003 |
| 2001/0016879 A1 | 8/2001 | Seklguchi et al. |
| 2002/0049869 A1 | 4/2002 | Ohmura et al. |
| 2002/0069369 A1 | 6/2002 | Tremain |
| 2002/0099753 A1 | 7/2002 | Hardin et al. |
| 2002/0124137 A1 | 9/2002 | Ulrich et al. |
| 2002/0129078 A1 | 9/2002 | Plaxton et al. |
| 2003/0028861 A1 | 2/2003 | Wallman et al. |
| 2003/0033431 A1 | 2/2003 | Shinomiya |
| 2003/0084242 A1 | 5/2003 | Strange et al. |
| 2003/0097422 A1 | 5/2003 | Richards et al. |
| 2003/0110351 A1 | 6/2003 | Blood et al. |
| 2003/0126242 A1 | 7/2003 | Chang |
| 2003/0126388 A1 | 7/2003 | Yamagami |
| 2003/0142561 A1 | 7/2003 | Mason et al. |
| 2003/0182325 A1 | 9/2003 | Manley et al. |
| 2003/0182494 A1 | 9/2003 | Rodrigues et al. |
| 2004/0010787 A1 | 1/2004 | Traut et al. |
| 2004/0028043 A1 | 2/2004 | Maveli et al. |
| 2004/0098425 A1 | 5/2004 | Wiss et al. |
| 2004/0123063 A1 | 6/2004 | Dalal et al. |
| 2004/0133611 A1 | 7/2004 | Cabrera et al. |
| 2004/0205310 A1 | 10/2004 | Yamagami |
| 2004/0205391 A1 | 10/2004 | Thompson |
| 2004/0221290 A1 * | 11/2004 | Casey ................... G06F 9/50 718/104 |
| 2004/0230972 A1 * | 11/2004 | Donovan ........... G06F 9/45533 718/1 |
| 2004/0250034 A1 | 12/2004 | Yagawa et al. |
| 2004/0254964 A1 | 12/2004 | Kodama et al. |
| 2004/0260873 A1 | 12/2004 | Watanabe |
| 2004/0268340 A1 | 12/2004 | Steeb et al. |
| 2005/0050115 A1 | 3/2005 | Kekre |
| 2005/0071549 A1 | 3/2005 | Tross et al. |
| 2005/0108292 A1 | 5/2005 | Burton |
| 2005/0125465 A1 | 6/2005 | Arakawa et al. |
| 2005/0125609 A1 | 6/2005 | Satoyama |
| 2005/0138089 A1 | 6/2005 | Kasai |
| 2005/0160248 A1 | 7/2005 | Yamagami |
| 2005/0193245 A1 | 9/2005 | Hayden et al. |
| 2006/0080362 A1 | 4/2006 | Wagner et al. |
| 2006/0271606 A1 * | 11/2006 | Tewksbary ........ G06F 17/30132 707/999.203 |
| 2010/0011178 A1 * | 1/2010 | Feathergill ......... G06F 11/1466 711/162 |
| 2010/0115332 A1 * | 5/2010 | Zheng ............... G06F 11/1461 714/6.2 |

OTHER PUBLICATIONS

"LindowsOS™ 3.0 is a new operating system that delivers the power, stability and cost-savings of Linux® with the ease of (56) References Cited

OTHER PUBLICATIONS windows", 2 pages, http://www.lindows.com/lindows_products_lindowsos.php. [Retrieved Dec. 13, 2002].
"Savannah", Savannah: This is the Savannah admin documentation, Free Software Foundation, Inc., 2002, 31 pages, http://savannah.nongnu.org/docs/admin.php. [Retrieved Dec. 13, 2002].
"Virtuozzo Basics", Basics of Virtuozzo Technology, SWsoft, 2002, http://www.sw-soft.com/en/products/virtuozzo/basics. [Retrieved Dec. 13, 2002].
"What is Virtual Environment (VE)?", SWsoft, 2002, http://www.sw-soft.com/en/products/virtuozzo/ve. [Retrieved Dec. 13, 2002].
"Products", NeTraverse, Inc., 2002, 1 page, http://www.netraverse.com/products/index.php. [Retrieved Dec. 13, 2002].
"NeTraverse Win4Lin 4.0—Workstation Edition", NeTraverse, Inc., 2002, 1 page, http://www.netraverse.com/products/win4lin40/. [Retrieved Dec. 13, 2002].
"Win4Lin Desktop 4.0: Benefits", NeTraverse, Inc., 2002, 1 page, http://www.netraverse.com/products/win4lin40/benefits.php. [Retrieved Dec. 13, 2002].
"Win4Lin Desktop 4.0: New Features in Win4Lin 4.0", NeTraverse, Inc., 2002, 2 pages, http://www.netraverse.com/products/win4lin40/features.php. [Retrieved Dec. 13, 2002].
"Win4Lin Desktop 4.0: System Requirements", NeTraverse, Inc., 2002, 2 pages, http://www.netraverse.com/products/win4lin40/requirements.php. [Retrieved Dec. 13, 2002].
"Win4Lin Terminal Server 2.0: Thin-Client Server-Computing on Linux from NeTraverse", NeTraverse, Inc., 2002, 1 page, http://www.netraverse.com/ products/wts. [Retrieved Dec. 13, 2002].
"Win4Lin Terminal Server 2.0: Thin-Client Server-Computing on Linux, Benefits", NeTraverse, Inc., 2002, 1 page, http://www.netraverse.com/products/wts/benefits.php. [Retrieved Dec. 13, 2002].
"Win4Lin Terminal Server 2.0: Distribute Windows Applications to Thin-clients Today!", NeTraverse, Inc., 2002, 2 pages, http://www.netraverse.com/products/wts/features.php. [Retrieved Dec. 13, 2002].
"Win4Lin Terminal Server 2.0: Server System Requirements", NeTraverse, Inc., 2002, 2 pages, http://www.netraverse.com/products/wts/requirements.php. [Retrieved Dec. 13, 2002].
"Win4Lin Terminal Server 2.0: Thin-Client Server-Computing on Linux, NeTraverse Technology", NeTraverse, Inc., 2002, 1 page, http://www.netraverse.com/products/wts/technology.php. [Retrieved Dec. 13, 2002].
"Win4Lin: Delivering Windows Application Support on Linux, A Product Overview", NeTraverse, Inc., 2002, 5 pages, http://www.netraverse.com/ support/docs/Win4Lin-whitepaper.php. [Retrieved Dec. 13, 2002].
"Virtual PC™ for Windows®", Connectix Corporation, 2002, 2 pages, version 5.0.
Gardner, David, "Wine FAQ", Wine Development HQ, 2002, 13 pages.
"Winelib User's Guide", Wine Development HQ, 2002, 29 pages.
Sheets, et al., "Wine User Guide", Wine Development HQ, 2002, 56 pages.
"Wine Developer's Guide", Wine Development HQ, 2002, 110 pages.
"A Guide to Understanding Veritas Volume Replicator", Veritas Volume Replicator™ White Paper, Jun. 2002, 15 pages.
Hitz, et al., "File System Design for an NFS File Server Appliance", Technical Report 3002 Rev. C, Mar. 1995, 23 pages.
"VERITAS Storage Replicator™: Real-time Replication for Business Critical Windows NT and Windows 2000 Environments", Veritas White Paper, Jan. 2001, 10 pages.
Hansen, et al., "Nomadic Operating Systems", Dec. 10, 2002, 42 pages.
Govil, Kinshuk, "Virtual Clusters: Resource Mangement on Large Shared-Memory Multiprocessors", Oct. 2000, 131 pages.
Sapuntzakis, et al., "Optimizing the Migration of Virtual Computer", Proceedings of the 5th Symposium on Operating Systems Design and Implementation, Dec. 31, 2002, pp. 377-390, revised Feb. 12, 2003, ACM, New York, NY, USA.
Thekkath, et al., "Frangipani: A Scalable Distributed File System", Proceedings of the Sixteenth ACM Symposium on Operating Systems Principles, Oct. 1, 1997, pp. 224-237, ACM, New York, NY, USA.
"VERITAS FlashSnap™ Point-In-Time Copy Solutions", Administrator's Guide 1.1, VERITAS Software Corporation, Aug. 2002, 90 pages.
"VERITAS File System™ 3.5", Administrator's Guide, VERITAS Software Corporation, Aug. 2002, 192 pages.
"VERITAS Volume Manager™ 3.5", Administrator's Guide, VERITAS Software Corporation, Aug. 2002, 364 pages.
"Comprehensive Application Performance Management with Veritas i3™", VERITAS Software Corporation, 2003, 3 pages.
"VERITAS Enterprise Server Automation", VERITAS Software Corporation, 2003, 8 pages.
"Server Consolidation with VERITAS OpForce™: Optimizing your Infrastructure Availability and Utilization", VERITAS Software Corporation, 2003, 6 pages.
"Server Automation with VERITAS OpForce™: Enterprise Operations Automation-Enhancing Workflows, Administration, and Management", VERITAS Software Corporation, 2003, 6 pages.
"Rapid Server Deployment with VERITAS OpForce™: The Enterprise-Scale, Server Deployment Solution for Heterogeneous Environments", VERITAS Software Corporation, 2003, 6 pages.
"High Availability Clustering in a Microsoft Windows Environment: VERITAS Cluster Server™ for Microsoft® Windows NT®", VERITAS Software Corporation, 2000, 20 pages.
"VERITAS Cluster Server™ v2.0: Technical Overview", VERITAS Software Corporation, 2001, 12 pages.
"Managing Application Availability with Application Clustering and the VERITAS Cluster Server Version 2.0", VERITAS Software Corporation, 2002, 32 pages.
Sapuntzakis, et al., "Optimizing the Migration of Virtual Computers", Proceedings of the Fifth Symposium on Operating Systems Design and Implementation, Dec. 31, 2002, 14 pages, ACM, New York, NY, USA.
Helfrich, et al., "Internet Suspend/Resume", ISR Project Home Page, 2003, 4 pages.
Kozuch, et al., "Internet Suspend/Resume", Proceedings of the Fourth IEEE Workshop on Mobile Computing Systems and Applications, Jun. 2002, 7 pages.
Kozuch, et al., "Efficient State Transfer for Internet Suspend/Resume", Intel Research Pittsburgh Technical Report IRP-TR-02-03, May 2002, 12 pages.
Tolia, et al., "Using Content Addressing to Transfer Virtual Machine State", Intel Research Pittsburgh Technical Report IRP-TR-02-11, Summer 2002, 9 pages.
Flinn, et al., "Data Staging on Untrusted Surrogates", Intel Research Pittsburgh Technical Report IRP-TR-03-03, Mar. 2003, 15 pages.
Tolia, et al., "Opportunistic Use of Content Addressable Storage for Distributed File Systems", Intel Research Pittsburgh Technical Report IRP-TR-03-02, Jun. 2003, 15 pages.
"VMware Control Center", VMware, Inc., 2003, 3 pages, http://vmware.com/products/cc_features.html. [Retrieved Jul. 2, 2003].
McMillan, Robert, "VMware Launches VMware Control Center", Jun. 30, 2003, 2 pages, http://www.infoworld.com/article/03/06/30/HNvmware_1.html. [Retrieved Jul. 2, 2003].
"VMware Control Center: Enterprise-class Software to Manage and Control Your Virtual Machines", Product Datasheet, VMware, Inc., 2003, 2 pages.
Abbott, John, "VMware Heads Toward Utility Computing With New Dynamic Management Tools", Jul. 1, 2003, 4 pages.
Milojicic, et al., "Process Migration", Aug. 10, 1999, 49 pages.
Sun, et al., "A Coordinated Approach for Process Migration in Heterogeneous Environments", SIAM Parallel Processing Conference, 1999, 12 pages.
Chanchio, et al., "Data Collection and Restoration for Heterogeneous Process Migration", 1997, 6 pages.
Chanchio, et al., "A Protocol Design of Communication State Transfer for Distributed Computing", 21st International Conference on Distributed Computing Systems, Apr. 2001, 4 pages.

(56) References Cited

OTHER PUBLICATIONS

"The OpenMosix Cluster", SourceForge.net, 2003, 14 pages, http://sourceforge.net:80/docman/display_doc.php?docid=10390&group_id=46729. [Retrieved Jun. 20, 2003].

Buytaert, et al., "So what is openMosix Anyway?: A very, very brief introduction to clustering", The openMosix HowTo: Live free( ) or die( ), May 7, 2003, 3 pages, http://howto.ipng.be/openMosix-HOWTO/c117.html. [Retrieved Jun. 20, 2003].

Buytaert, et al., "don't", The openMosix HowTo: Live free( ) or die( ), May 7, 2003, 2 pages, http://howto.ipng.be/openMosixWiki/index.php/don't. [Retrieved Jun. 20, 2003].

Govil, et al., "Cellular Disco: Resource Management Using Virtual Clusters on Shared-Memory Multiprocessors", Proceedings of the Seventeenth ACM Symposium on Operating Systems Principles, Dec. 12, 1999, pp. 154-169, ACM, New York, NY, USA.

Bugnion, et al., "Disco: Running Commodity Operating Systems on Scalable Multiprocessors", ACM Transactions on Computer Systems, Nov. 1997, 32 pages, ACM, New York, NY, USA.

"VMware GSX Server", White Paper, VMware, Inc., Dec. 2000, 12 pages.

"VMware GSX Server", Product Datasheet, VMware, Inc., 2001, 2 pages.

"VMware Server Remote Management", Product Information, VMware, Inc., 2000, 2 pages.

"VMware ESX Server", Product Datasheet, VMware, Inc., 2001, 2 pages.

Varian, Melinda, "VM and the VM Community: Past, Present, and Future", Aug. 1997, pp. 1-68.

"Comparison: Microsoft Logical Disk Manager (LDM) and VERITAS Volume Manager™ for Microsoft Windows", Veritas White Paper, May 2001, 5 pages.

"How VERITAS Volume Manager™ Complements Hardware Raid in Microsoft Windows Server Environments", Veritas White Paper, May 2001, 8 pages.

"VERITAS Volume Manager™ for Windows: Best Practices", Veritas White Paper, Mar. 2002, 9 pages.

Sosinky, Barrie, "The Business Value of Virtual Volume Management: In Microsoft Windows NT and Windows 2000 Networks", Veritas White Paper, Oct. 2001, 15 pages.

"VERITAS Volume Manager™ for Windows NT", May 2001, 4 pages, version 2.7.

"BladeFrame™ System Overview", Egenera, Inc., 2001, 2 pages.

"The Egenera™ Processing Area Network (PAN) Architecture", White Paper, Egenera, Inc., 2002, 21 pages.

"Emerging Server Architectures", White Paper, Egenera, Inc., 2001, 13 pages.

"Improving Data Center Performance", White Paper, Egenera, Inc., 2001, 20 pages.

"Guidelines for Effective E-Business Infrastructure Management", White Paper, Egenera, Inc., 2001, 12 pages.

"The Pros and Cons of Server Clustering in the ASP Environment", White Paper, Egenera, Inc., 2001, 11 pages.

"Taking Control of the Data Center", Position Paper, Engenera, Inc., 2001, 5 pages.

"The Linux Operating System: How Open Source Software Makes Better Hardware", Position Paper, Engenera, Inc., 2001, 3 pages.

"Information Made Manageable™: Solution Overview", TrueSAN Networks, Inc., 2002, 7 pages.

Magnusson, et al., "Simics: A Full System Simulation Platform", Computer, The Institute of Electrical and Electronics Engineers, Inc., Feb. 2002, pp. 50-58.

"Introduction to Simics Full-System Simulator without Equal", Virtutech White Paper, Jul. 8, 2002, 35 pages.

"The Technology of Virtual Machines", A Connectix white paper, 2001, 14 pages.

* cited by examiner

METHOD TO ALLOW MULTI-READ ACCESS FOR EXCLUSIVE ACCESS OF VIRTUAL DISKS BY USING A VIRTUALIZED COPY OF THE DISK

BACKGROUND OF THE INVENTION

Field of the Invention

This invention relates to the field of computer processing and, more particularly, to efficient dynamic browsing of virtualized backup image copies.

Description of the Related Art

As computer memory storage and data bandwidth increase, so does the amount and complexity of data that business and industry manage each day. A large portion of the data that may be managed in an enterprise involves content managed for a company or workgroup by a dedicated server, such as an enterprise information portal. The enterprise information portal provides employees and customers the ability to search and access corporate information. Such information may include electronic documents, announcements, tasks, discussion topics, email and so forth. As virtualization techniques enhance datacenter (server room) agility, the corporate information may also include software layer, or virtualization layer, files.

Continuing with the virtualization layer files, in some instances, these files are part of a hypervisor and run directly on the hardware without the need of a host operating system (OS). Privileged and sensitive calls within a corresponding OS may be set to automatically trap to the hypervisor. Abstracting the OS and applications from the hardware and encapsulating them into portable virtual machines (VMs) has enabled virtual infrastructure features generally not possible with hardware alone. For example, datacenters demand rapid adaptability, requiring a single server to run one OS for a period of time then be quickly redeployed to run another OS serving a different purpose. Virtual machines are used to provide this resource management capability.

Although virtualization technology provides many benefits to a datacenter, the protection of critical files may be complex in order to support the virtual machines (VMs) across multiple hosts and to protect against security issues with guest OS cache data and unauthenticated connections. Protection methods may need to support multiple combinations of operating systems and hypervisors. Useful security solutions may use run-time knowledge of both OS and kernel internal operations, such as process data structures, sockets, files, and so forth, to perform meaningful remediation, behavior analysis, and false positive analysis. A hypervisor may additionally use file-level locking to provide protection to file-system integrity. This information may be backed up and archived along with the other previous examples of critical information.

An enterprise information portal often includes a back-end database system. The back-end database may be a variant of a stand-alone database system, which has been configured for document and content management. Following a database backup to protect and archive critical information, a user may choose to perform one of multiple operations on the backup image. The multiple operations include browsing data, restoring data, duplicating data, an incremental backup, a subsequent full backup, and so forth. In order to access individual items in a backup image without individually backing them up, a granular catalog identifying individual items may be built during the backup operation. However, building the catalog at this time significantly increases the time to perform the backup.

An alternative method for building the catalog is dynamically generating the catalog during browse and restore operations by accessing the backup image. However, a backup image may have exclusive access settings. For example, in order to further protect a virtual disk file in a backup image folder, a virtual disk development kit (VDDK) application programmer's interface (API) may create the exclusive access settings for the virtual disk file. An example is an access lock limiting access of the virtual disk file in the backup image folder to one session. This limitation prevents multi-session support for the virtual disk file in the backup image folder. Accordingly, building the catalog is moved from the time of browsing to the time of backing up, thus, lengthening the backup operation. In addition, operations are serialized for the virtual disk file, rather than performed concurrently. Subsequent incremental backup, duplicate and other operations are required to wait while a single session is browsing, rather than continue.

In view of the above, improved systems and methods for efficient dynamic browsing of virtualized backup image copies are desired.

SUMMARY OF THE INVENTION

Systems and methods for dynamic browsing of virtualized backup image copies are contemplated.

In various embodiments, a backup system includes a client computer that generates access requests for backup images, a backup server, and a backup storage medium that stores at least backup images. The client computer sends to the backup server a request to open a browse session for a given backup image stored on the backup medium. The given backup image may be a backup virtual disk file. The virtual disk file is typically locked by a hypervisor for protection against consistency problems. For example, the lock provides exclusive single-session access for the given backup image.

Responsive to receiving the request for the browse session, a backup application on the backup server determines whether a virtual copy already exists for the given backup image. If not, the backup application creates the virtual copy. The backup application directs a virtual file filter to open the virtual copy in order to obtain pointer information for later redirections. The virtual file filter may be a driver. The backup application also directs the hypervisor to open the virtual copy in order to create a lock file for the virtual copy. The backup application and the virtual file filter route access requests between the given backup image and the virtual copy based on a type of the access requests. For example, each of the write requests for the given backup image and read requests for modified data in the given backup image may be routed to the virtual copy. Read requests for unmodified data in the given backup image may be routed to the given backup image.

These and other embodiments will be appreciated upon reference to the following description and accompanying drawings.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, signals, computer program instruction, and techniques have not been shown in detail to avoid obscuring the present invention.

Figure 1:
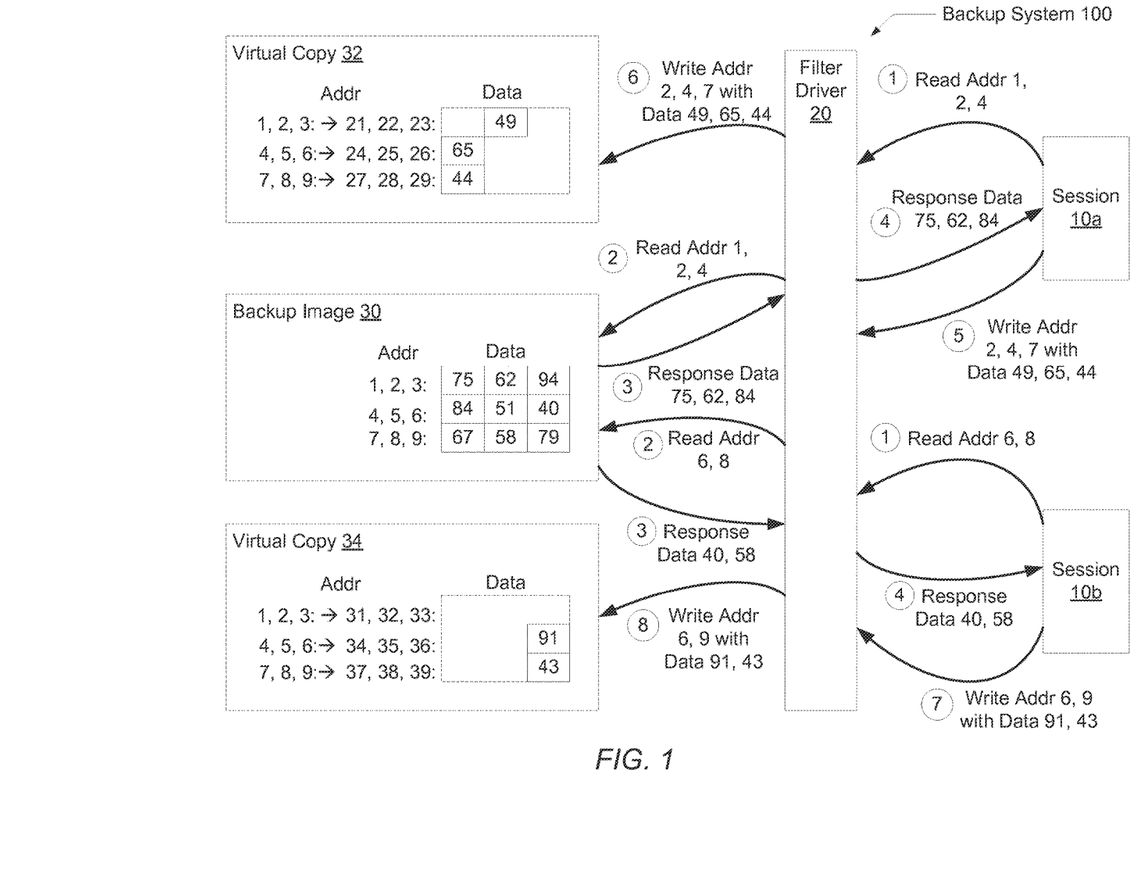
FIG. 1 is a generalized block diagram illustrating one embodiment of a backup system.

Referring to FIG. 1, a generalized block diagram of one embodiment of a backup system 100 is shown. Sessions 10a-10b may correspond to active sessions within multiple copies of an application, such as a backup application. The copies of the application may run on separate client computers. The client computers may include a laptop, desktop, server, workstation, terminal, personal digital assistant (PDA) or any other type of computer system. The backup application may provide archiving functionality, such as various features provided by the Enterprise Vault™ or Backup Exec™ products from Veritas. For example, the backup application may communicate with databases for selecting and retrieving content for archiving. Additionally, the backup application may perform restore and browse functionality of backup image files.

The backup application may provide a graphical user interface (GUI) for a user to select commands for executing particular operations. The operations on the backup application may include a full backup operation, an incremental backup operation, a browse operation, a restore operation, a duplication operation and so forth. When a user selects an operation to run, a corresponding session may be spawned or opened. Each session may be identified by a unique session identifier (ID). Alternatively, the sessions 10a-10b may be opened by automated processes, such as automatic backups performed on a predetermined schedule by an information technology (IT) administrator. Each of the sessions 10a-10b may execute a variety of commands based on the selected operation and further input from the user. Although two sessions are shown, any number of sessions may be opened and executing in the backup system 100.

The sessions 10a-10b may access backup images stored on persistent memory. A single backup image 30 is shown although any number of backup images may be stored. The backup image 30 may be a monolithic backup of content performed by the backup application at an earlier time. Although the backup image 30 includes records, tables, and so forth, and the content may be stored with compression techniques, the content of the backup image 30 is simplified for illustrative purposes. For example, the backup image 30 is shown with nine data blocks with addresses 1 to 9. The top row of the data blocks stores the values 75, 62 and 94 at addresses 1 to 3. The second row of the data blocks stores the values 84, 51 and 40 at addresses 4 to 6. The third row of the data blocks stores the values 67, 58 and 79 at addresses 7 to 9. Each block of the nine data blocks may represent both metadata and data, such as user data, parity data, log file data, mapping table data, and so on.

The backup image 30 may be controlled outside to have exclusive single-session access for protection against consistency problems. For example, the backup image 30 may be a backup virtual disk file with a VMDK file format. A hypervisor, such as VMWare ESXi in one example, may use a lock file when a first session opens access to the backup image 30. In some examples, the lock file is created in a same directory as the VMDK files. Therefore, no other session is able to access the backup image 30 while the first session remains open. Without the lock file, multiple sessions may read and write to the backup virtual disk file, causing data corruption.

Although the exclusive single-session access provided by the hypervisor lock file prevents consistency problems, the multiple sessions now have serial access to the backup image 30. Subsequent incremental backup operations, other browse sessions by other users, and so forth now wait for the current single session with access to close.

An additional issue is the lack of a catalog operation. The backup application (not shown here) may provide a granular restore operation that allows a user to restore individual items without individually backing them up. To be able to perform the granular restore operation, a catalog for the individual item is pre-collected at backup time or the catalog for the individual item is dynamically generated at the time of a browse operation by accessing the on-disk backup image. However, the exclusive single-session access lock on the backup image of the VMDK file prevents multiple sessions from accessing it. Therefore, generation of the catalog that supports a granular restore operation is done at the time of the backup operation, which significantly lengthens that operation. The support by Microsoft Exchange and SharePoint agents in the Backup Exec application for generating the catalog at the time of the browse operation is lost.

To provide multi-session access to the backup image 30 without causing consistency problems, the backup application may work in tandem with the filter driver 20. In some embodiments, the filter driver 20 is a software driver used to monitor, intercept and redirect access requests and responses between the backup image 30 and one or more of the hypervisor and a respective session of the sessions 10a-10b. When a session initially attempts to access the backup image 30, a virtual copy may be created. The virtual copy may not be a literal copy of the backup image 30. Rather, in some cases, a virtual copy is a subfolder in a pathname for the backup image 30. These steps are described in further detail later.

As shown, the virtual copy 32 corresponds to the session 10a. Similarly, the virtual copy 34 corresponds to the session 10b. In some examples, the virtual copies 32 and 34 are stored in volatile memory, such as random access memory (RAM) on a dedicated backup server. In contrast, the backup image 30 may be stored in non-volatile memory such hard disk drives (HDDs), solid-state drives (SSDs), or other.

The virtual copies 32 and 34 do not store a copy of the 9 data blocks in the backup image 30. Rather, the virtual copies 32 and 34 may be used to store and convey modifications performed by write operations to the backup image 30. Therefore, read requests for unmodified data in the backup image 30 may be provided from the backup image 30. Write requests from the session 10a to the backup image 30 may be performed in the virtual copy 32. Similarly, write requests from the session 10b to the backup image 30 may be performed in the virtual copy 34. Read requests for modified data may be retrieved from the corresponding virtual copy of the copies 32 and 34.

When the session 10a initially accesses the backup image 30, the backup application (not shown) determines whether the virtual copy 32 already exists. If not, the backup application creates the virtual copy 32. At this point, the virtual copy 32 does not store any data from the backup image 30. The backup application may instruct the hypervisor to open the virtual copy 32. A lock file may be placed now on the virtual copy 32, rather than the backup image 30. Similar steps occur for the virtual copy 34.

Eight sequences are shown in the illustrated example. At sequence 1, each of the sessions 10a-10b send read requests for data in the backup image 30. The session 10a sends a read request for data at addresses 1, 2 and 4. The session 10b sends a read request for data at addresses 6 and 8. As shown, each of the virtual copies 32 and 34 show address mapping, as they are not stored in locations identified by addresses generated by the clients initiating the sessions 10a-10b. Although mapping is also possible with the backup image 30, no mapping is shown for ease of illustration.

A dedicated server may be located in a server room for managing backup operations and data storage. The read requests may pass through and be processed by the operating system (OS) on the server, the backup application, the hypervisor, and the filter driver 20. The filter driver monitors the traffic and determines whether to intercept transactions based on target destinations.

At sequence 2, the hypervisor intends to send the read requests to a respective one of the virtual copies 32 and 34. However, the filter driver 20 intercepts the requests and redirects the read requests to the backup image 30. The concurrent read requests pass to the backup image 30, which is simultaneously accessed. At sequence 3, the response data for each of the read requests is returned to the dedicated server, which contains the filter driver 20. The response data for the session 10a includes the data blocks 75, 62 and 84. The response data for the session 10b includes the data blocks 40 and 58. In some embodiments, the response data is conveyed from the filter driver 20 to the hypervisor before being conveyed to the sessions 10a-10b. At sequence 4, the response data is sent to the sessions 10a-10b. Therefore, multi-session access is supported for the backup image 30 although the hypervisor is still present in the system. Each of the virtual copies 32 and 34 are locked, though, by the hypervisor.

At sequence 5, the session 10a sends a write request to modify addresses 2, 4 and 7 with the new data 49, 65 and 44. The filter driver 20 monitors the write request and does not intercept it as the request targets the data content in the virtual copy 32, rather than the data content in the backup image 30. The hypervisor sends the write request to the virtual copy 32. At sequence 6, the data blocks 2, 4 and 7 within the virtual copy 32 are updated. Similar steps occur for sequences 7 and 8 for the session 10b. The data blocks at addresses 6 and 9 within the locked virtual copy 34 are updated with the requested information. The unlocked backup image 30 is still available for multi-session support allowing other operations to simultaneously run while the read and write access requests are processed.

Figure 2:
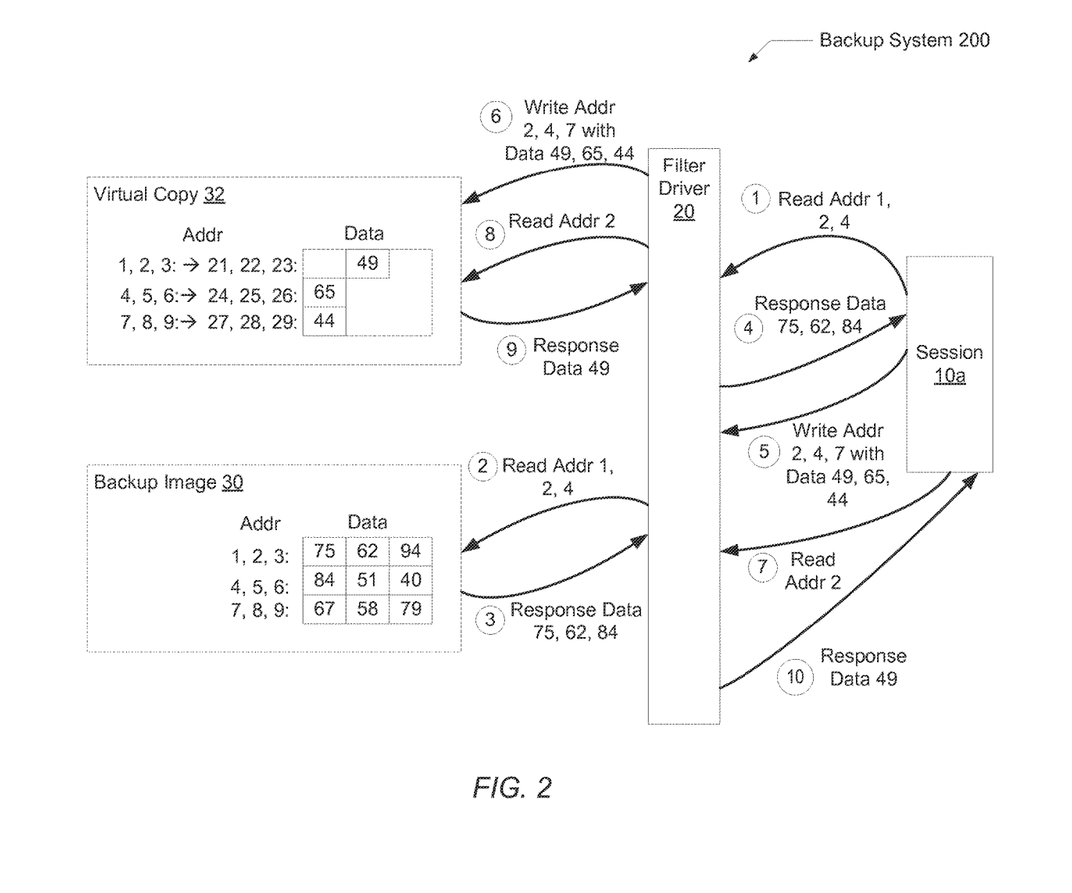
FIG. 2 is a generalized block diagram illustrating one embodiment of a backup system.

Turning now to FIG. 2, a generalized block diagram of another embodiment of a backup system 200 is shown. Components corresponding to circuitry and logic already described are numbered accordingly. Here, a single session, session 10a, is shown for ease of illustration. Any number of sessions may be present. Sequences 1-6 occur as previously described. In sequence 7, the session 10a sends a read request for data at address 2. Since the data has been modified, the filter driver 20 does not intercept the read request and redirect it to the backup image 30. Rather, the filter driver 20 allows the read request to follow the path set by the hypervisor and the read request is conveyed to the locked virtual copy 32. The modified data block storing the value 49 is sent back to the session 10a in sequences 9 and 10. The filter driver 20 monitors the traffic, but does not intercept the responses. The hypervisor may receive the response prior to the response data is sent to the session 10a. The hypervisor is unaware of the filter driver 20. The exclusive, single-session access of the locked virtual copy 32 provides the same behavior to the hypervisor when compared to the prior locked access of the backup image 30 before the use of the filter driver 20 and the redirecting of accesses.

Figure 3:
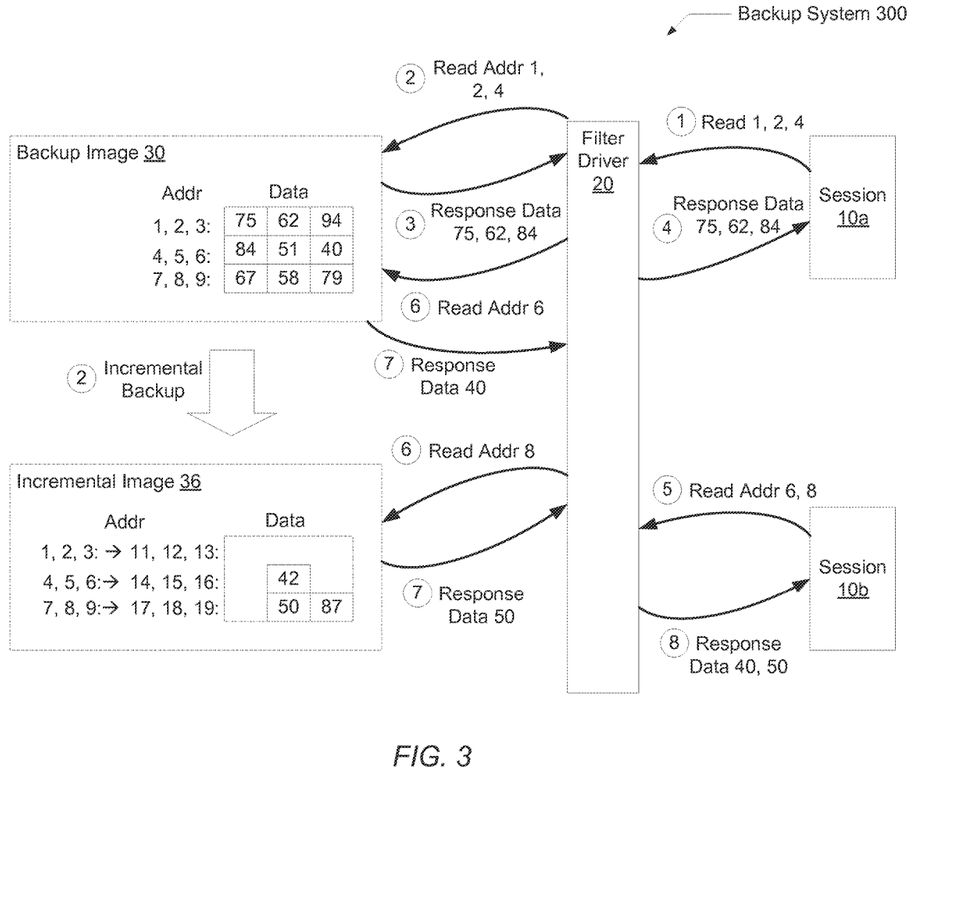
FIG. 3 is a generalized block diagram illustrating one embodiment of a backup system.

Turning now to FIG. 3, a generalized block diagram of yet another embodiment of a backup system 300 is shown. Components corresponding to circuitry and logic already described are numbered accordingly. Here, two sessions 10a-10b are shown again. The corresponding virtual copies 32 and 34 are not shown for ease of illustration, but they do exist as earlier described. Sequences 1-4 occur almost as previously described. Now, the session 10b is not yet sending any access requests. In addition, an incremental backup operation occurred at sequence 2. Therefore, the unlocked backup image 30 is simultaneously accessed again by multiple sessions.

The incremental image 36 may be stored in persistent storage. As shown, the incremental image 36 does not include a full copy of the backup image 30. Rather, only updates are stored in the incremental image 36. For example, the data blocks at addresses 5, 8 and 9 are updated with new values based on changes in the system since the full backup operation that created the backup image 30. The backup image 30 is the parent backup image for the incremental image 36. It is noted the virtual copy 32 (not shown here) is created at sequence 1, as before. However, the virtual copy 34 (not shown here) is not yet created, as the session 10b has not yet generated any requests.

At sequence 5, the session 10b sends a read request for data stored in the data block identified by the addresses 6 and 8. The filter driver 20 intercepts the read requests for unmodified data for session 10b. Although updates occurred for the data blocks at addresses 5, 8 and 9 due to the incremental backup, no data blocks have been modified by the session 10b. Therefore, the hypervisor routes the read requests to the locked virtual copy 34 (not shown here). In various embodiments, for incremental & full block access, a determination is made whether to get the block from an incremental or a full backup image. For example, when an incremental is mounted, the current incremental may contain the desired block, a previous incremental may contain the desired block, and so on until a full backup is reached. The filter driver 20 may then create a virtualized backup image chain including one or more incrementals and a full backup. For each disk in the virtualized chain, the filter driver 20 may make each virtualized vmdk file in the chain appear as though it is a real VMDK file. The hypervisor may determine whether to retrieve the desired block from an incremental image or a full backup image and send a corresponding access request to the virtualized VMDK file associated with the chosen backup image (incremental or full backup).

For read requests from session 10b for data unmodified by session 10b, the hypervisor sends the requests to a first virtual copy for data not updated by the incremental backup and sends requests to a second virtual copy for data updated by the incremental backup. The filter driver 20 intercepts the read requests to the virtual copies for data unmodified by the session 10b and redirects them to the incremental image 36 for the data blocks updated by the incremental backup and to the parent backup image 30 for the requested data blocks that were not updated during the incremental backup operation. For example, the incremental backup did not update the data block identified by the address 6. The corresponding read request from the hypervisor to a virtual copy corresponding to the backup image 30 is intercepted by the filter driver 20 and redirected to the backup image 30. The incremental backup updated the data block identified by the address 8. The corresponding read request from the hypervisor to a virtual copy corresponding to the incremental backup image 36 is intercepted by the filter driver 20 and redirected to the incremental image 36. The filter driver 20 at sequence 7 receives the response data. The session 10b receives the response data in sequence 8. It is noted, when session 10b modifies data with write requests, the corresponding virtual copy is accessed. Subsequent read requests receive the modified data stored in the corresponding virtual copy. As described earlier for FIGS. 1 and 2, these write requests and read requests for data modified by session 10b are sent to the corresponding virtual copy by the hypervisor and the filter driver 20 does not redirect them. Again, the unlocked images 30 and 36 are accessed by multiple sessions and other operations may simultaneously run as serial execution is removed.

Figure 4:
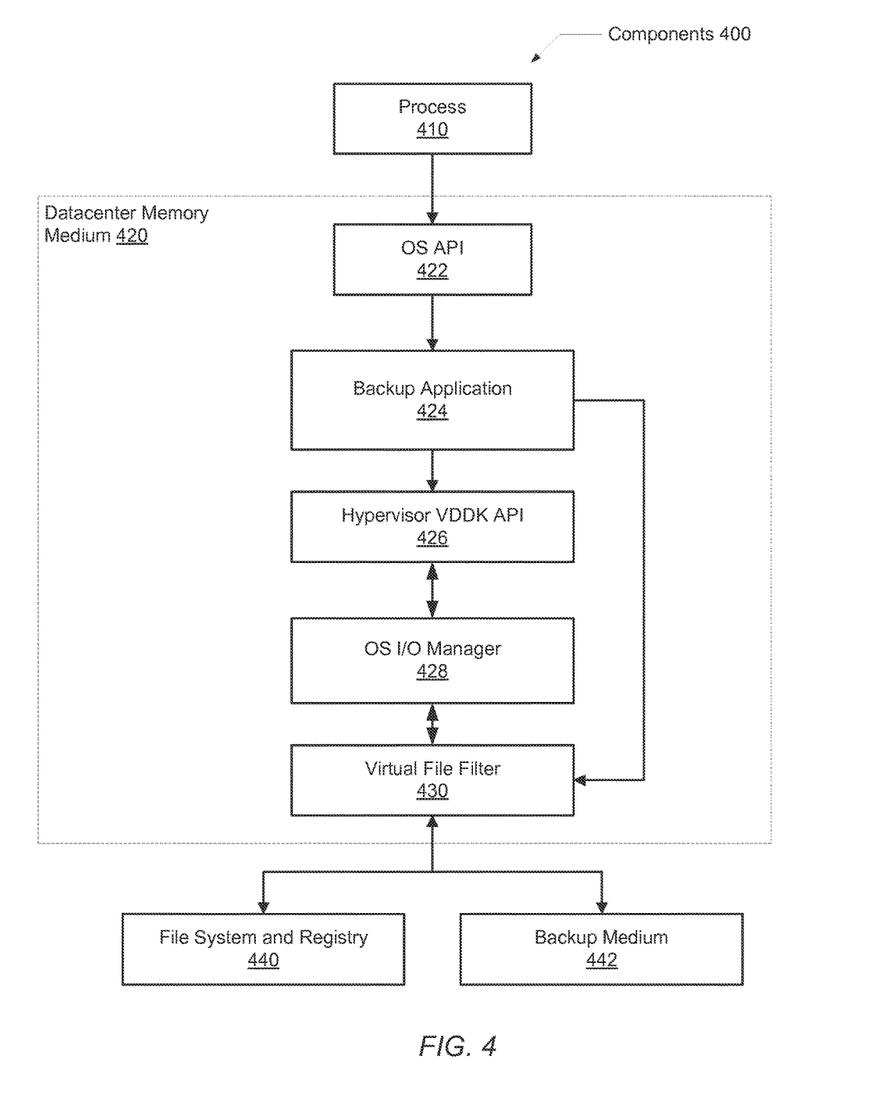
FIG. 4 is a generalized block diagram illustrating one embodiment of components for supporting efficient multi-session access of a backup image typically having exclusive access.

Turning now to FIG. 4, one embodiment of components 400 for supporting efficient multi-session access of a backup image typically having exclusive access is shown. As shown, a process 410 is coupled to a datacenter memory medium 420. In some embodiments, the process 410 may run on a user's client computer, such as a laptop, desktop, server, workstation, terminal, personal digital assistant (PDA) or any other type of computer system. The process 410 may be created by the operating system and an application running on the client's computer. In other embodiments, the process 410 may run on a server in a server room. In some embodiments, the spawning of the process 410 may be performed in response to an application managed automatically or manually by an information technology (IT) administrator.

The datacenter memory medium 420 may be memory located in a dedicated server for managing data storage and access for a company or an enterprise. In various embodiments, the datacenter is a server room used for managing data for a company. As shown, the datacenter memory medium 420 is coupled to a file system and registry 440 and an interface for a backup medium 442. The file system shall is information system which references and stores data, hierarchically organized in files and directories, in a volume created on the backup medium 442. The file system provides access to the data on the backup medium 442. The registry is a centralized configuration database for an operating system, as well as for applications. The registry stores information about tuning parameters, device configuration, and user preferences. The backup medium 442 may include non-volatile data storage, such as hard disk drives (HDDs), solid-state drives (SSDs), tape media, or other. One or more network interfaces may be used for connecting the components such as Ethernet, fiber optic, or coaxial adapters.

The process 410 may be generated by a corresponding operating system when an application processes a data backup operation. The data backup operation may be one of at least a browse operation, a delayed cataloging operation, a restore operation, a full backup operation, and an incremental backup operation. The process 410 may generate input/output (I/O) access requests for data in a backup file within a backup image folder stored in a database in the datacenter. The backup file within the backup image folder may be stored on the backup medium 442. A system user, an IT administrator, or an automatic process within an application setup by the IT administrator may produce the process 410.

An intranet portal configured to be the 'user' of a database may generate the process 410. The intranet portal may serve as the gateway to log into the corporate network and retrieve electronic documents. The intranet portal is typically secure and private, but additional external gateways for wider or even public access may be included. In various implementations, the intranet portal is embodied by a Microsoft® Sharepoint® server, or a similar enterprise information portal program. A backup copy of a database stored on the backup medium 442.

Generally speaking, a database refers to the executable commands, user interfaces and other program code for operating the database. The databases may further include various tables, indexes, relationships, queries, stored procedures, file systems, security layers, networking interfaces, etc., which are configured to operate on a plurality of data records, also referred to as records or entries, that constitute the "database."

One example of a database backed up on the backup medium 442 is a virtual disk file. The virtual disk file stores the contents of a virtual machine's non-volatile memory, such as content that would be stored on a hard disk drive. This content may include partition information, data, any installed operating system and other applications, redo log files for storing changes made to the corresponding virtual disk while the virtual machine is running, and so forth. An example of a virtual disk file format is VMDK. An example of a hypervisor that utilizes the virtual disk file is VMWare ESXi.

The datacenter memory medium 420 may include storage of software on a dedicated server for managing other servers and data storage devices used for storing enterprise data, such as at least backup image files. In some embodiments, the dedicated server may be physically located in a separate location than the computer or device running the process 410. The datacenter memory medium 420 includes an operating system (OS) representative of any of a variety of specific operating systems, such as, for example, Microsoft Windows, Linux, or Sun Solaris. As such, the operating system may be operable to provide various services to the end user and provide a software framework operable to support the execution of various programs such as an Intranet Portal application, a backup application, one or more hypervisors or any of a variety of other applications. It is noted that the depicted software components of FIG. 4 may be paged in and out of a respective main memory in a conventional manner from a storage medium such as hard drive.

The OS application programmer's interface (API) 422 may operate in a conventional manner. Briefly, the OS API 422 receives I/O access requests from the process 410 and sends the requests from user mode to kernel mode. The OS API 422 may validate API parameters for the received I/O access requests. As shown, the OS I/O manager 428 is located after other components and interfaces with the file system and registry 440 and the backup medium 442. However, the functionality of the OS I/O manager 428 may be located before other components or integrated within other components. The OS I/O manager 428 handles I/O access requests and commands from the process 410 directed to data stored on the backup medium 442.

The backup application 424 uses the backup medium 442 to store backup image files. The backup application 424 may provide archiving functionality, such as various features provided by the Enterprise Vault™ or Backup Exec™ products from Veritas. For example, the backup application 424 may communicate with databases for selecting and retrieving content for archiving. Additionally, the backup application 424 may perform restore and browse functionality of backup image files.

The backup application 424 may create various types of backups of data stored on the backup medium 442. For example, image based, file based, or other types of backups may be created. The backup application 424 may create and store a backup image file in a commonly known file format, such as the Virtual Hard Disk (VHD) format, the V2I format, and the Virtual Machine Disk Format (VMDK) format.

The backup image files stored on the backup medium 442 include backup copies of virtual disk files. In some cases, the virtual disk files store data for virtual machine monitors (VMMs) that monitor corresponding VMs and redirect requests for resources to appropriate application program interfaces (APIs) in the hosting environment. In other cases, the virtual disk files store data for hypervisors that run directly on the hardware without the need of a host OS as the hypervisor includes an OS. This type of software layer, or type of VMM, is referred to as a hypervisor. Privileged and sensitive calls within a corresponding OS may be set to automatically trap to the hypervisor.

Some databases have exclusive access for protection. For example, some hypervisors provide exclusive access to backup files of particular virtual disk files. In one example, the hypervisor VMWare ESXi provides exclusive access to a backup image of a VMDK file by providing a lock on the backup image through an API, such as through the virtual disk development kit (VDDK) API 426 shown in the datacenter memory medium 420. The VDDK is a software development kit (SDK) that includes a collection of C/C++ libraries, code samples, utilities, and documentation for supporting the development of applications for virtual backup operations. Responsive to detecting an open command for the VMDK file, the VDDK API 426 sets a lock on the VMDK file to ensure exclusive access. Therefore, only one session at a time is able to access the VMDK file.

Preventing multi-session access of the VMDK file to protect against consistency problems, such as multiple sessions overwriting metadata at the same time, also prevents many operations from running. For example, without the lock, multiple sessions could overwrite metadata of the VMDK file at the same time, such as multiple restore operations concurrently executing on the same VMDK file. Additionally, a user may wish to open multiple browsing and restore sessions from different user interfaces connected to the backup application 424. For example, the Backup Exec Media Server may provide user interfaces for opening sessions. However, the user is limited to opening a single session due to the lock provided by the hypervisor, such as VMWare ESXi. Further, multiple separate operations are unable to simultaneously run on the VMDK file due to the lock. While a single browsing or restore session is processing, subsequent operations, such as an incremental backup, a duplication, and other browsing operations by other users, are prevented from occurring as these additional operations need to mount the disk backup image file to collect metadata or perform a catalog operation.

In addition to the above issues, the enforced exclusive access on the backup image file causes a catalog operation to run during the backup operation rather than during a subsequent browse operation. Thus, the duration for completing the backup operation is lengthened. The backup application 424 may provide a granular restore operation that allows a user to restore individual items without individually backing them up. To be able to perform the granular restore operation, a catalog for the individual item is pre-collected at backup up time or the catalog for the individual item is dynamically generated at the time of a browse operation by accessing the on-disk backup image.

The exclusive access lock on the backup image of the VMDK file prevents multiple sessions from accessing it. Therefore, generation of the catalog that supports a granular restore operation is done at the time of the backup operation. The support by Microsoft Exchange and SharePoint agents in the Backup Exec application for generating the catalog at the time of the browse operation is lost. However, a driver, such as the virtual file filter (VFF) 430, may be added to support multi-session access of the backup image of the VMDK file. Therefore, the catalog generation may be skipped during the backup operation and occur during a browse or a restore operation.

The VFF 430 supports creating a virtual copy of the backup virtual disk file. The VFF 430 causes the virtual copy to be locked by the hypervisor VDDK API 426, rather than the backup virtual disk file is locked. Since the VFF 430 is located by the OS I/O manager 428 and interconnects directly with the backup application 424, the hypervisor VDDK API 426 is unaware of the VFF 430. In various embodiments, the VFF 430 is a driver and the VFF 430 both monitors and intercepts requests and commands between the OS I/O manager 428, the file system and registry 440 and the backup medium 442. The VFF 430 may also interact directly with the backup application 424.

The backup application 424 and the VFF 430 may use the hypervisor VDDK API 426 to open and lock a created virtual copy of the chosen backup virtual disk file. The VFF 430 may intercept read requests for unmodified data in the backed up virtual disk file. The VFF 430 may intercept these requests and redirect the requests from the locked virtual copy where the hypervisor VDDK API 426 sent them to the unlocked backed up virtual disk file. Write requests and read requests for modified data may be sent by the hypervisor VDDK API 426 to the locked virtual copy. When the session ends, any modified data blocks stored in the virtual copy may be discarded or persisted. The user may indicate the choice either at the start of the session or alternatively at the end of the session. Below, a further description is provided for using the VFF 430 to provide efficient browsing of a backup virtual disk file.

Figure 5:
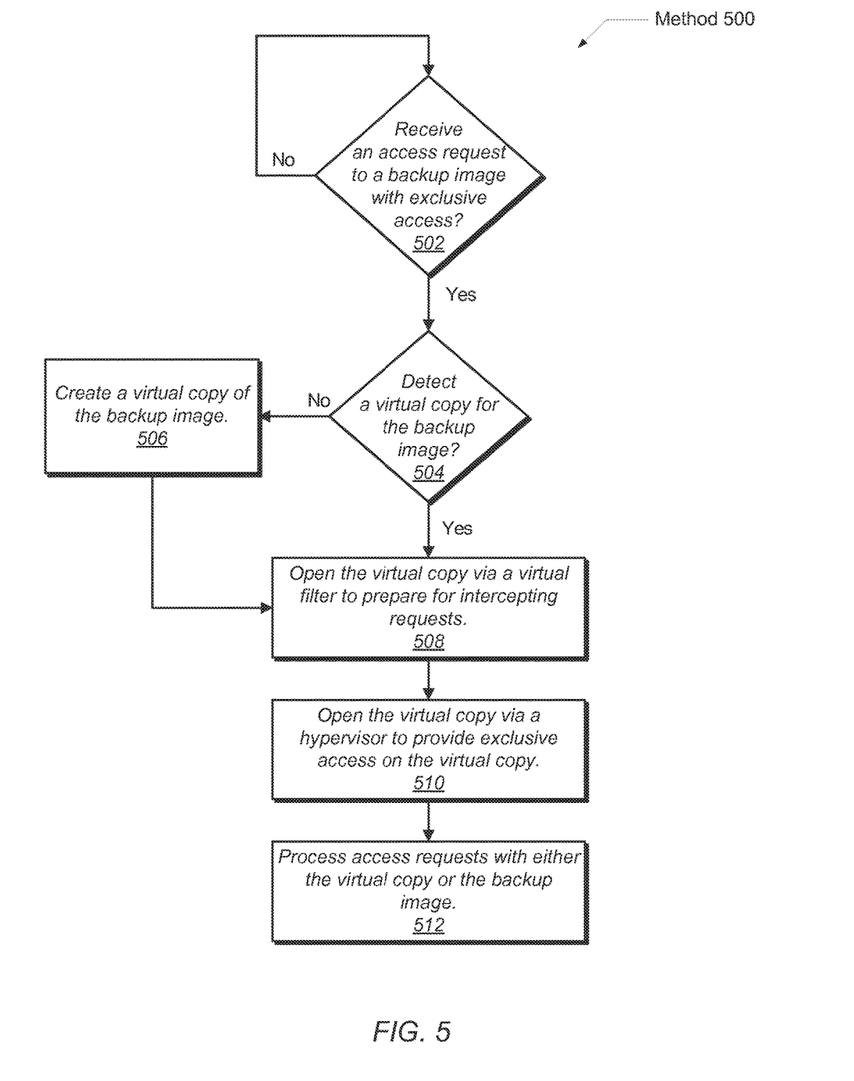
FIG. 5 is a flow diagram illustrating one embodiment of a method for setting up efficient multi-session access of a backup image typically with exclusive access.

Referring now to FIG. 5, an embodiment of a method 500 for setting up efficient multi-session access of a backup image, which typically is set to have exclusive access, is shown. For purposes of discussion, the steps in this embodiment are shown in sequential order. However, some steps may occur in a different order than shown, some steps may be performed concurrently, some steps may be combined with other steps, and some steps may be absent in another embodiment.

A monolithic backup of content is performed at an earlier time. In various embodiments, an enterprise information portal on a dedicated server in a datacenter may manage the data. The backup of data may occur responsive to a user command or an automatic process with one or more backup schedules set by an IT administrator. On a client computer, a user may initiate a browse operation for a backup image, which is typically opened with exclusive access. The user may use a graphical user interface (GUI) for opening a browse session. Through the GUI, the user may select a browse option to view contents or available characteristics of a backed up virtual disk file. Alternatively, an application with an automated schedule may initiate other types of operations for the backup image, which is typically opened with exclusive access. An example of such a backup image is a VMDK file.

Referring again to FIG. 4, the OS API 422 receives the open session request from the client process 410 on the client computer, wherein the request is from a user or from an application operating on a set schedule. Responsive to receiving the access request (conditional block 502), it is verified in block 504 whether a virtual copy is already created for the backup image. For example, the backup application 424 may receive a particular identifier from the request that identifies the chosen backup virtual disk file. This identifier may be combined with other information to form a key. Examples of other information used to form a key may include at least one or more of the virtual disk file name, the pathname, the date and time stamp, and the site name. For example, a virtual copy that was previously created may be placed in a subfolder of the backup image folder storing the backup virtual disk file. Therefore, in some embodiments, the backup application 424 may use the pathname to verify whether a virtual copy already exists.

If the virtual copy does not already exist (conditional block 504), then in block 506, the virtual copy is created. In various embodiments, the backup application 424 creates the virtual copy for the backup image by adding a subfolder under the backup image folder storing the backup image. For example, the pathnames may use the following formats for a VMDK file:

| D:\BEData\IMG000001\ becomes vm1.vmdk | D:\BEData\IMG000001\ vm1.vmdk V1\ (subfolder) img000001.vm1.vmdk img000001.vm1.vmdk.delta img000001.vm1.vmdk.delta.array img000001.vm1.vmdk.delta.blks img000001.vm1.vmdk.delta.view |
|---|---|

As seen in the above, the backup image folder "D:\BEData\IMG000001" includes the backup virtual disk file "vm1.vmdk". Additionally, after the virtual copy is created, the backup image folder includes a "V1" subfolder. The backup image subfolder includes multiple files to support the virtual copy of the backup image. Following, control flow of method 500 moves to block 508. Similarly, if the virtual copy does already exist (conditional block 504), then control flow of method 500 moves to block 508.

In block 508, the virtual copy is opened via a virtual filter or driver to prepare for intercepting requests. For example, in FIG. 4, the backup application 424 opens the virtual copy of the VMDK file through the VFF 430 so that the VFF 430 will later intercept the input/output requests for the virtual copy of the VMDK file. The VFF 430 opens the virtual copy and prepares mappings and pointer ranges used for determining when to intercept an I/O request from the OS I/O manager 428 and for determining the corresponding mapping.

In block 510, the virtual copy is opened via a hypervisor to provide exclusive access on the virtual copy. In various embodiments, the backup application 424 instructs the hypervisor VDDK API 426 to open the virtual copy, prepare to receive read data responses of the VMDK file from the OS I/O manager 428, and provide a lock to enforce exclusive access for the virtual copy. The hypervisor is unaware it is locking the virtual copy rather than the original backup image. To lock the virtual copy, a lock file may be added in the backup image subfolder used to implement the virtual copy as shown in the following:

| D:\BEData\IMG000001\ becomes vm1.vmdk V1\ (subfolder) img000001.vm1.vmdk img000001.vm1.vmdk.delta img000001.vm1.vmdk.delta.array img000001.vm1.vmdk.delta.blks img000001.vm1.vmdk.delta.view | D:\BEData\IMG000001\ vm1.vmdk V1\ (subfolder) img000001.vm1.vmdk img000001.vm1.vmdk.delta img000001.vm1.vmdk.delta.array img000001.vm1.vmdk.delta.blks img000001.vm1.vmdk.delta.view img000001.vm1.vmdk.delta.lck |
|---|---|

The virtual copy is open for access after the hypervisor locks the virtual copy. In block 512, access requests are processed using either the virtual copy or the backup image. In some embodiments, the backup application 424 and the VFF 430 determine when to use the original backup image and the virtual copy. The hypervisor may be unaware of switching between the backup image and the virtual copy. In some embodiments, the backup image is accessed in multi-session manner with no lock for read requests for unmodified data. The virtual copy may be accessed in an exclusive single-session manner for write requests and read requests for modified data.

Figure 6:
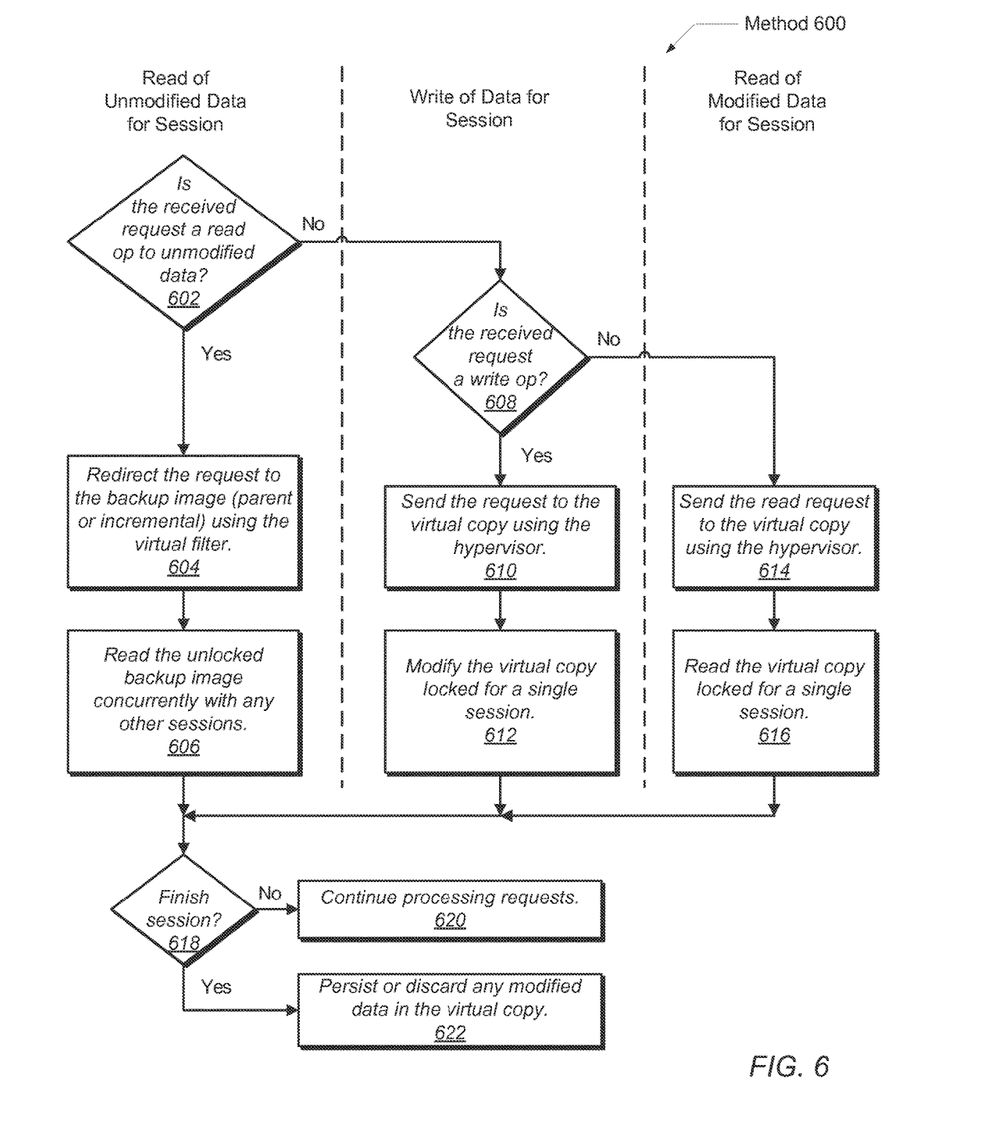
FIG. 6 is a flow diagram illustrating one embodiment of a method for performing efficient multi-session access of a backup image typically with exclusive access.

Referring now to FIG. 6, an embodiment of a method 600 for performing efficient multi-session access of a backup image, which typically is set to have exclusive access, is shown. For purposes of discussion, the steps in this embodiment are shown in sequential order. However, some steps may occur in a different order than shown, some steps may be performed concurrently, some steps may be combined with other steps, and some steps may be absent in another embodiment.

When the virtual copy is created for a backup image and each of the hypervisor VDDK API and the VFF, such as the components 426 and 430 in FIG. 4, are notified by the backup application to intercept requests and responses, session requests are processed. Responsive to the backup system receiving a read request for unmodified data in the backup image (conditional block 602), in block 604, the VFF 430 intercepts the request from the OS I/O manager 428 and redirects the read request to the backup image.

The backup image may be a parent backup image, which is the full backup image. Alternatively, the backup image for the read request may be an incremental backup image. The choice of which version of the backup image to use is based on the time the session opened. If the incremental backup already occurred when the session opened, then the incremental backup image may be accessed. However, datasets that did not change for the incremental backup may be accessed within the parent backup image.

Due to the multi-session access of the parent backup image, an incremental backup operation may occur concurrently with browse and restore operations performed in other sessions. Should an incremental backup operation occur while a given session is accessing the parent backup image and its virtual copy, the given session continues to access these datasets as if the incremental backup operation did not occur. To lock the virtual copy of incremental backup images, a respective lock file may be added in the backup image subfolder used to implement the virtual copy as shown in the following:

| | |
|---|---|
| D:\BEData\IMG000001\ becomes vm1.vmdk | D:\BEData\IMG000001\ vm1.vmdk V1\ (subfolder) img000001.vm1.vmdk img000001.vm1.vmdk.delta img000001.vm1.vmdk.delta.array img000001.vm1.vmdk.delta.blks img000001.vm1.vmdk.delta.view img000001.vm1.vmdk.delta.lck |
| D:\BEData\IMG000002\ becomes vm1.vmdk | img000002.vm1.vmdk img000002.vm1.vmdk.delta img000002.vm1.vmdk.delta.array img000002.vm1.vmdk.delta.blks img000002.vm1.vmdk.delta.view img000002.vm1.vmdk.delta.lck |
| D: \BEData\IMG000003\ becomes vm1.vmdk | img000003.vm1.vmdk img000003.vm1.vmdk.delta img000003.vm1.vmdk.delta.array img000003.vm1.vmdk.delta.blks img000003.vm1.vmdk.delta.view img000003.vm1.vmdk.delta.lck |

As seen in the above, a full backup operation has a corresponding virtual copy placed in the subfolder "V1". Two incremental backup operations occur afterward. Each of the incremental backup images has a corresponding virtual copy placed in the same subfolder "V1" already designated for the parent backup image. As described earlier, the parent backup image uses the folder "D:\BEData\IMG000001", which includes the full backup virtual disk file "vm1.vmdk". The first incremental backup image uses the folder "D:\BEData\IMG000002\", which includes the incremental virtual disk file "vm1.vmdk" in the respective folder. The second incremental backup image uses the folder "D:\BEData\IMG000003\", which includes the incremental virtual disk file "vm1.vmdk" in the respective folder. The corresponding locked files used to create virtual copies for the incremental backup images are stored in the same subfolder "V1" used for the parent backup image.

Continuing with the method 600, in block 606, the unlocked backup image (parent or incremental) is accessed for read requests associated with unmodified data. Other sessions may be concurrently accessing the unlocked backup image. The VFF 430 may be redirecting the read requests from the OS I/O manager 428 to the unlocked backup image. When response data is received, the VFF 430 may send this data to the hypervisor VDDK API 426 either directly or via the OS I/O manager 428.

Responsive to the backup system receiving a write request for data in the backup image (conditional block 608), in block 610, the VFF 430 allows the write request to pass from the hypervisor VDDK API 426 to the locked virtual copy. In block 612, the data sets identified in the write request are overwritten in the virtual copy, which is locked for the single session.

Responsive to the backup system receiving a read request for modified data in the backup image (conditional block 614), in block 616, the VFF 430 allows the read request to pass from the hypervisor VDDK API 426 to the locked virtual copy. When response data is received, the VFF 430 may send this data to the hypervisor VDDK API 426 either directly or via the OS I/O manager 428. Responsive to the session completes and closes (conditional block 618), in block 622, any modified data stored in the delta files of the subfolder(s) is either discarded or persisted. A user, an IT administrator, or an automatic setting may decide on the choice. If the session has not closed (conditional block 618), then in block 620, requests continue to be processed as they are received by the backup system.

In various embodiments, one or more portions of the methods and mechanisms described herein may form part of a cloud computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A backup system comprising:
a backup server comprising circuitry; and
a backup storage medium;
in response to receiving a request for access to a backup image stored on the backup medium, wherein the request for access corresponds to an open session granting exclusive access to the backup image, the backup server is configured to:
in response to determining a virtual copy of the backup image associated with the open session identified by a session identifier does not exist:
create a virtual copy of the backup image associated with the open session; and
create a lock file that is associated with the virtual copy and not the unlocked backup image, wherein the lock file provides exclusive single-session access to the virtual copy while the backup image is unlocked and provides concurrent access by a plurality of sessions; and
store data associated with the request in the virtual copy without modifying the backup image while the session is open, in response to determining the request is a write request.

2. The backup system as recited in claim 1, wherein the backup server is further configured to send response data from the backup image to a requester responsive to determining the request for access is a read request from the requester is for data unmodified by the requester.

3. The backup system as recited in claim 1, wherein the backup server is further configured to route the received request for access to the virtual copy associated with the open session identified by the session identifier without sending the request for access to the backup image responsive to determining the type of the received request for access is either a write request or a read request for data previously modified in the virtual copy.

4. The backup system as recited in claim 1, further comprising a hypervisor configured to create the lock file for the virtual copy, and the backup server is further configured to direct the hypervisor to open the virtual copy.

5. The backup system as recited in claim 4, wherein the backup system further comprises a virtual file filter configured to redirect requests from the hypervisor targeting the backup image to the virtual copy.

6. The backup system as recited in claim 5, wherein the virtual file filter is further configured to send response data corresponding to read requests for data unmodified by a requester to the hypervisor from the backup image.

7. The backup system as recited in claim 4, wherein responsive to detecting one or more incremental backup images corresponding to the backup image, the backup server is further configured to:
- create a respective virtual copy for each of the one or more incremental backup images; and
- direct the hypervisor to open each respective virtual copy to create a lock file for each respective virtual copy and not the backup image.

8. The backup system as recited in claim 7, wherein the backup server is further configured to store modified data for the backup image and the one or more incremental backup images in a same subfolder under a pathname for the virtual copy.

9. A method comprising:
in response to receiving, by a backup server comprising circuitry, a request for access to a backup image stored on a backup storage medium, wherein the request for access corresponds to an open session granting exclusive access to the backup image:
  in response to determining, by the backup server, a virtual copy of the backup image associated with the open session identified by a session identifier does not exist:
    creating, by the backup server, a virtual copy of the backup image associated with the open session; and
    creating, by the backup server, a lock file that is associated with the virtual copy and not the unlocked backup image, wherein the lock file provides exclusive single-session access to the virtual copy while the backup image is unlocked and provides concurrent access by a plurality of sessions; and
  storing data associated with the request in the virtual copy without modifying the backup image while the session is open, if in response to determining the request is a write request.

10. The method as recited in claim 9, further comprises sending, by the backup server, response data from the backup image to a requester responsive to determining the request for access is a read request from the requester is for data unmodified by the requester.

11. The method as recited in claim 9, further comprising routing, by the backup server, the received request for access to the virtual copy associated with the open session identified by the session identifier without sending the request for access to the backup image responsive to determining the type of the received request for access is either a write request or a read request for data previously modified in the virtual copy.

12. The method as recited in claim 9, further comprising a hypervisor creating, by a hypervisor running on the backup server, the lock file for the virtual copy, and a backup server directing the hypervisor to open the virtual copy.

13. The method as recited in claim 12, further comprising redirecting, by a virtual file filter running on the backup server, to the backup image open session access requests to the virtual copy from the hypervisor.

14. The method as recited in claim 13, further comprising sending, by the backup server, to the hypervisor response data corresponding to read requests for data unmodified by a requester in the backup image.

15. The method as recited in claim 12, wherein responsive to detecting, by the backup server, one or more incremental backup images corresponding to the backup image, the method further comprises:
- creating a respective virtual copy for each of the one or more incremental backup images; and
- directing the hypervisor to open each respective virtual copy to create a lock file for each respective virtual copy.

16. The method as recited in claim 15, further comprising storing, by the backup server, modified data for the backup image and the one or more incremental backup images in a same subfolder under a pathname for the virtual copy.

17. A non-transitory computer-readable storage medium storing program instructions that are executable by a backup server comprising circuitry to:
in response to receiving a request for access to a backup image stored on the backup medium, wherein the request for access corresponds to an open session granting exclusive access to the backup image:
  in response to determining a virtual copy of the backup image associated with the open session identified by a session identifier does not exist:
    create a virtual copy of the backup image associated with the open session; and
    create a lock file that is associated with the virtual copy and not the unlocked backup image, wherein the lock file provides exclusive single-session access to the virtual copy while the backup image is unlocked and provides concurrent access by a plurality of sessions; and
  store data associated with the request in the virtual copy without modifying the backup image while the session is open, if in response to determining the request is a write request.

18. The non-transitory computer-readable storage medium as recited in claim 17, wherein the program instructions are further executable by a backup server to send response data from the backup image to a requester responsive to determining a read request from the requester is for data unmodified by the requester.

19. The non-transitory computer-readable storage medium as recited in claim 17, wherein the program instructions are further executable by a backup server to route the received request for access to the virtual copy associated with the open session identified by the session identifier without sending the request for access to the backup image responsive to determining the type of the received request for access is either a write request or a read request for data previously modified in the virtual copy.

20. The non-transitory computer-readable storage medium as recited in claim 17, wherein the backup image is a backup virtual disk file, and wherein the program instructions are further executable by a backup server to create lock files for accessing backup virtual disk files.

* * * * *

UNITED STATES PATENT AND TRADEMARK OFFICE
CERTIFICATE OF CORRECTION

PATENT NO. : 10,303,782 B1
APPLICATION NO. : 14/584265
DATED : May 28, 2019
INVENTOR(S) : Zhu et al.

Page 1 of 1

It is certified that error appears in the above-identified patent and that said Letters Patent is hereby corrected as shown below:

In the Claims

In Column 15, Claim 9, Line 57, please delete "if in response" and substitute -- in response --.

In Column 16, Claim 17, Line 51, please delete "if in response" and substitute -- in response --.

Signed and Sealed this
Second Day of July, 2019

Andrei Iancu
*Director of the United States Patent and Trademark Office*